Oct. 3, 1961 J. M. LOWE 3,002,874
APPARATUS FOR THE MANUFACTURE OF PNEUMATIC TYRES
Filed Jan. 23, 1956 7 Sheets-Sheet 1

INVENTOR
Jack Milner Lowe
by Benj. T. Pauber
his attorney

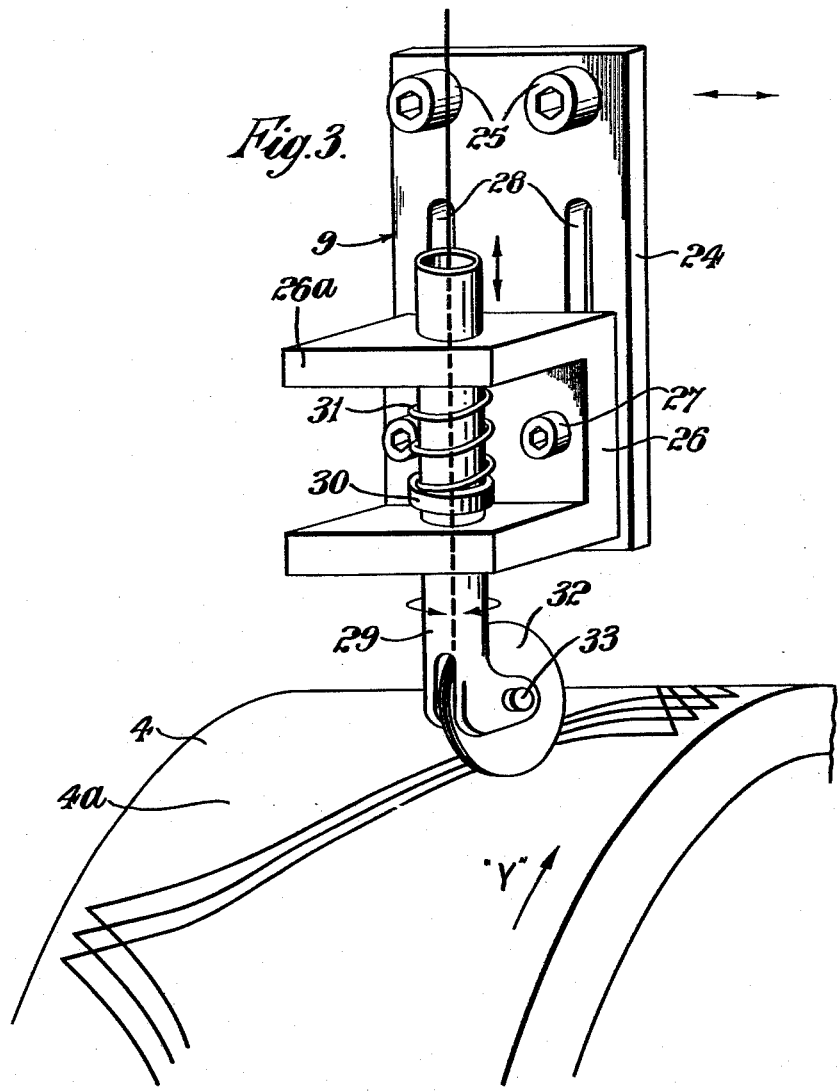

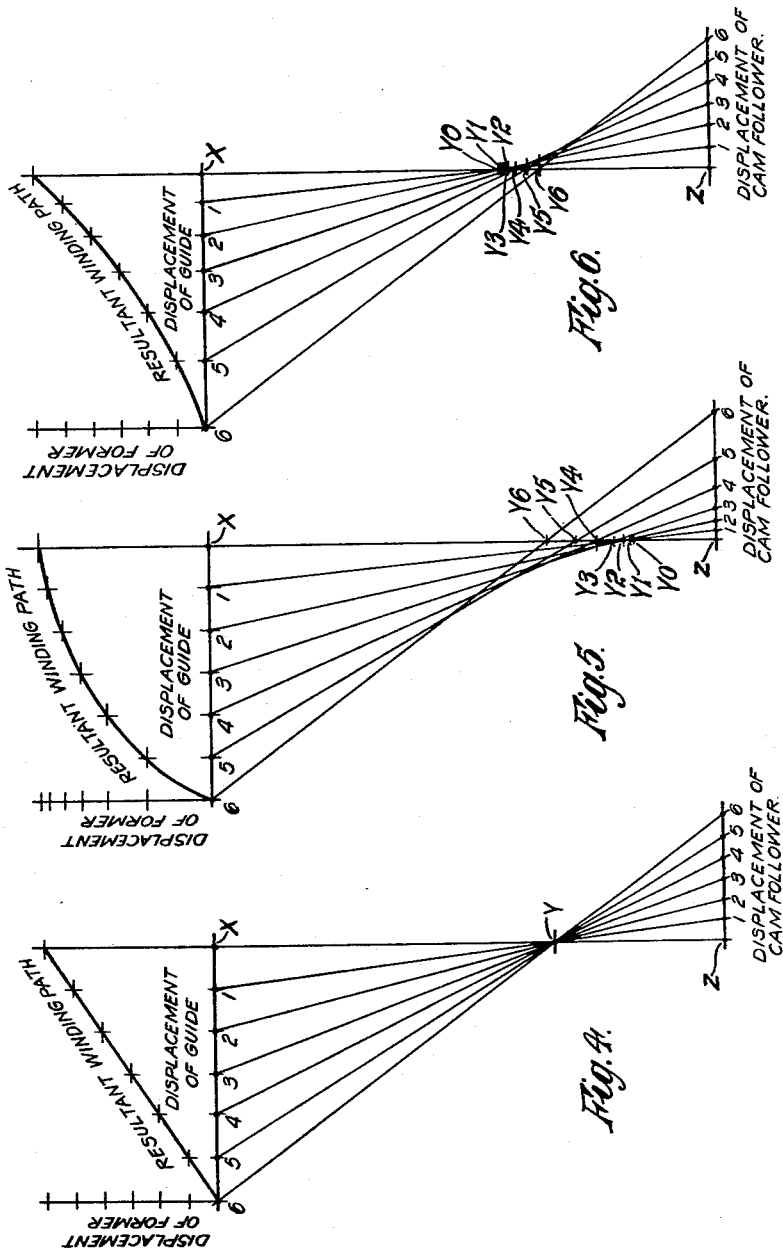

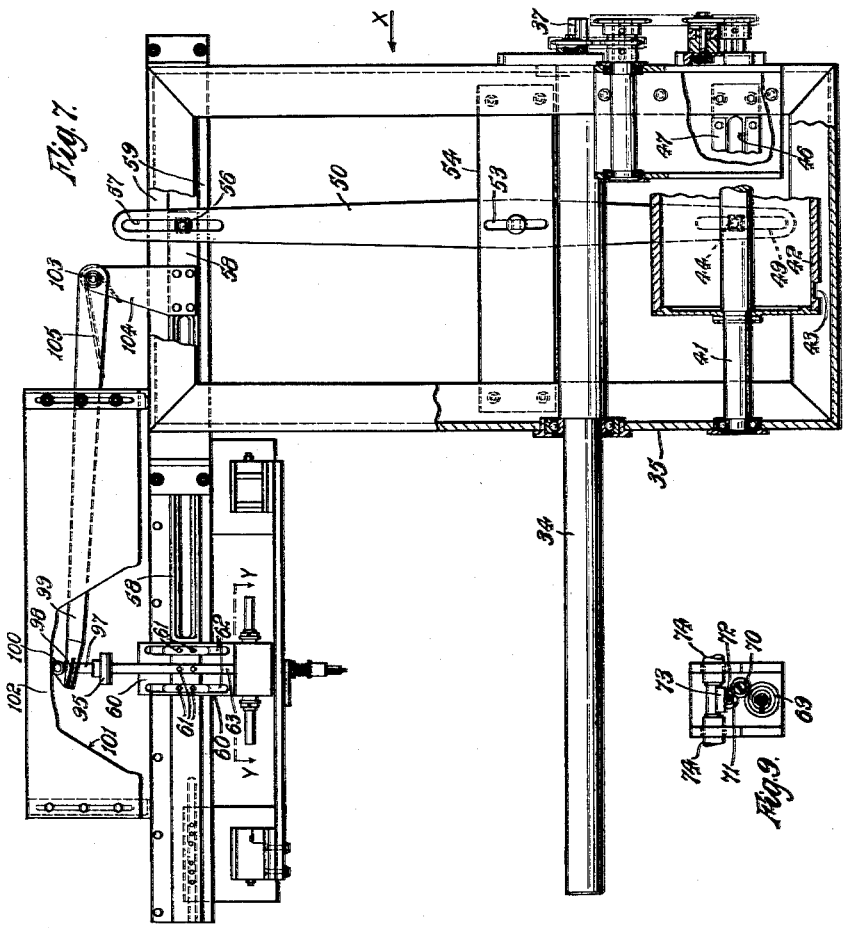

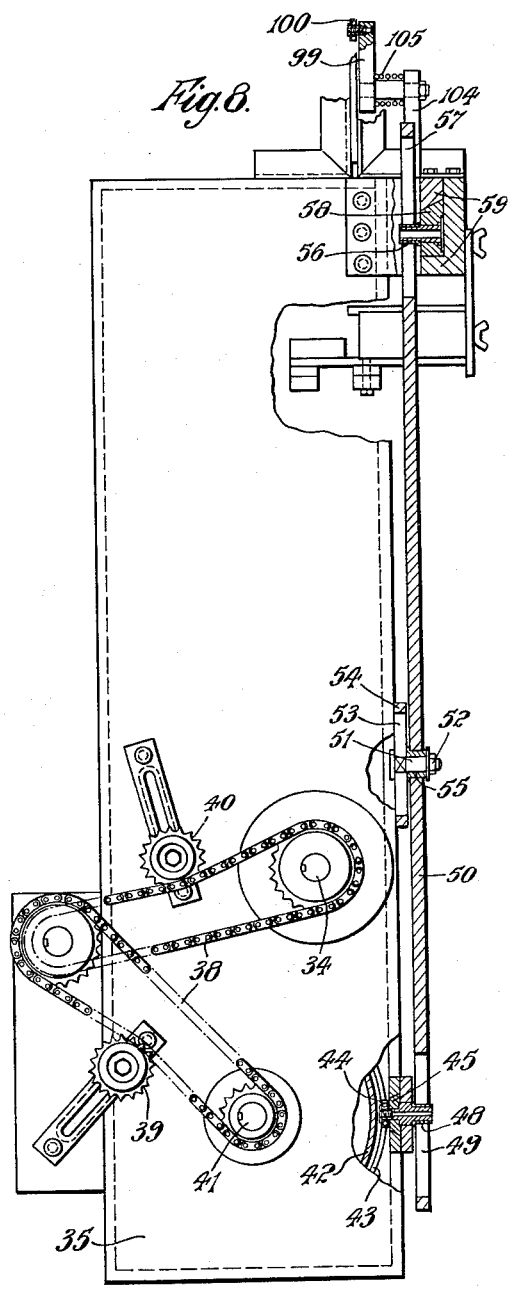

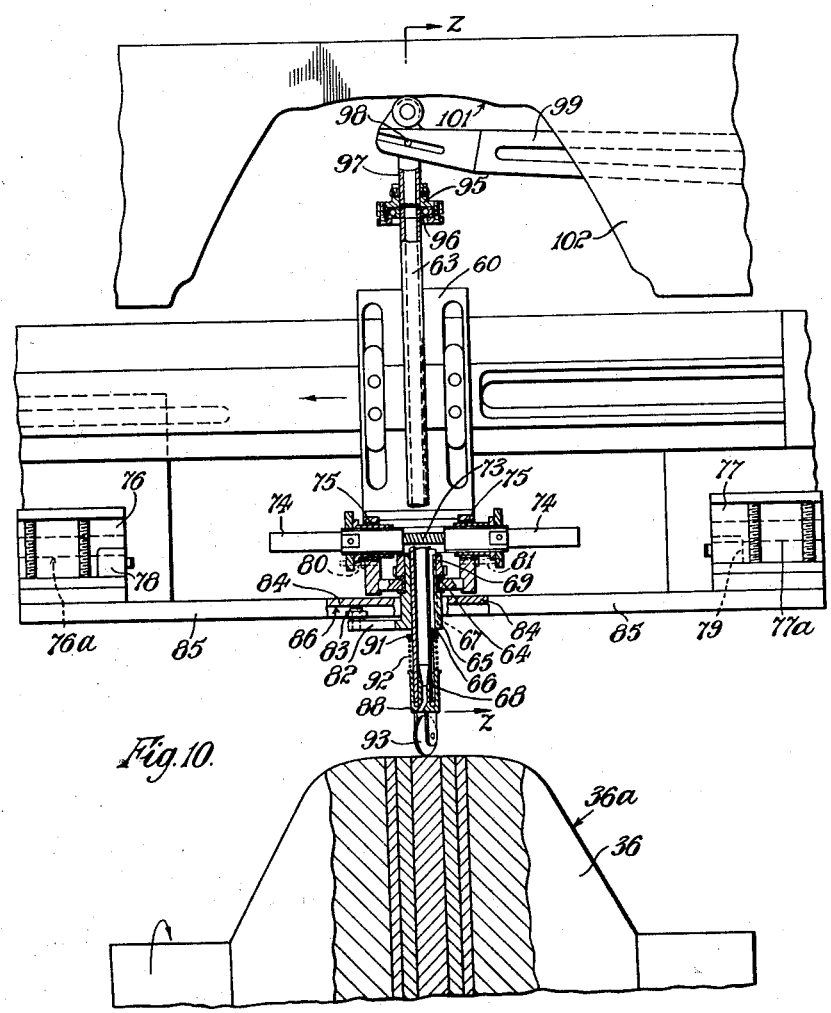

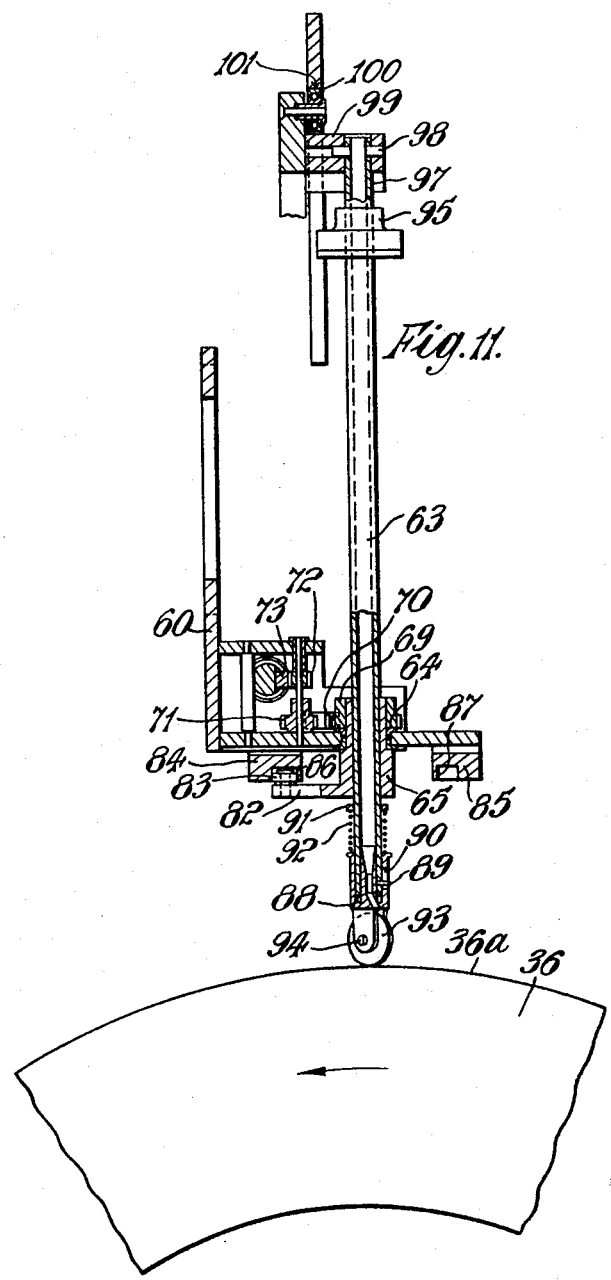

United States Patent Office 3,002,874
Patented Oct. 3, 1961

3,002,874
APPARATUS FOR THE MANUFACTURE OF PNEUMATIC TYRES
Jack Milner Lowe, Sutton Coldfield, England, assignor, by mesne assignments, to Dunlop Tire and Rubber Corporation, Buffalo, N.Y., a corporation of New York
Filed Jan. 23, 1956, Ser. No. 560,648
Claims priority, application Great Britain Feb. 1, 1955
15 Claims. (Cl. 156—397)

My invention relates to apparatus for the manufacture of pneumatic tyres and more particularly relates to apparatus for winding pneumatic tyre reinforcements such as are disclosed in co-pending application Ser. No. 518,518, filed June 8, 1955.

In the above co-pending application a tyre reinforcement is described which comprises a band formed from convolutions of a cord or cords progressively wound obliquely from one side of the band to the other in zig-zag formation, the cord or cords being substantially uniformly distributed around the band and the finished band having, at any transverse cross-section, an inner surface of parallel lengths of the cord or cords lying obliquely and in an opposed direction to adjacent superposed parallel length of cord or cords forming an outer surface.

My present invention provides apparatus for winding pneumatic tyre reinforcements of this type particularly apparatus for winding reinforcements comprising parallel lengths of cord, the angle of inclination of each of the said lengths varying either gradually or abruptly across the width of the reinforcement, and the angular disposition of the lengths being of such a value as to confer upon the tyre within which the reinforcement is incorporated, the required performance characteristics.

According to my invention apparatus for winding pneumatic tyre reinforcements of the type specified comprises a former having an outer peripheral winding surface, means for continuously rotating the former, a guide for the material to be wound located adjacent to the said surface and means for reciprocating the guide transversely over the said surface at a predetermined speed or speeds relative to the rate of rotation of the former in order to form the reinforcement.

Preferably the guide comprises a freely rotatable grooved guide pulley, so that accurate location of the cord or cords on the winding surface of the former is obtainable. The guide pulley may be carried in offset relationship to a castering shaft, the longitudinal axis of which is disposed radially with respect to the former, so that in operation the pulley, by castoring action, may assume an angle of inclination to conform with the inclination of a cord being wound relative to a circumferential line on the former at the point under consideration. Alternatively, means, preferably solenoid-operated, are provided for automatically adjusting the angle of inclination of the pulley in accordance with the required inclination of the cord relative to a circumferential line on the former at the point under consideration.

The guide reciprocating means is preferably a cam, for example of a grooved cylindrical type or a grooved plate type, designed to reciprocate the guide to give, in conjunction with the rotating former, the correct band width and the requisite disposition of the cord or cords on the former so as to form, for example, a winding made up of lengths of cord passing obliquely from side to side of the band, each oblique length having at each end a portion adjacent to the edge of the band lying at a greater angle to the said edge than the remaining portion of the oblique length.

In order to obtain by means of a single apparatus wound reinforcements in which the winding path is, e.g., sinusoidal, cycloidal or geodesic, or of any other of the forms referred to in the above mentioned co-pending application, the apparatus may comprise a cam and an associated follower, the said cam having a groove which is disposed either at a substantially constant helix angle or at a variable helix angle, said groove being adapted to reciprocate the follower from one side of the cam to the other and back again at a substantially constant linear velocity or at a variable linear velocity, respectively, when the cam is rotated at substantially constant angular velocity. The cam and follower are operatively connected to the guide pulley by means of a lever with which the follower and guide pulley are associated through pivotal connections, the lever itself being pivotally connected intermediate its ends to a frame, and the pivotal connections being adjustable and so arranged as to allow reciprocation by the cam of the guide pulley at a predetermined speed or speeds so that a reinforcement may be produced in which the winding path is, e.g., of a sinusoidal, cycloidal or geodesic nature.

The former may have a flat cylindrical winding surface or may have a winding surface of profiled cross-section, e.g. U-shaped. In the latter case cam means are provided to control the guide, during its movement axially of the former, to move along a path conforming with and adjacent to the profiled winding surface.

A gear box or adjustable gear train or chain drive may be provided for adjusting the number of reciprocations of the guide for each complete revolution of the former so that the apparatus is capable of producing tyre reinforcements of considerable variety.

The invention will now be described, by way of example, with reference to the accompanying drawings in which:

FIGURE 1 is an end elevational view of apparatus for winding a pneumatic tyre reinforcement, FIGURE 2 is a plan view of the machine illustrated in FIGURE 1, FIGURE 3 is a perspective view of a detail of the machine illustrated in the above-mentioned figures, FIGURES 4, 5 and 6 graphically represent three types of winding path obtainable by means of the machine illustrated in the preceding figures, FIGURE 7 is a part-cross-sectional side elevational view of an alternative machine, FIGURE 8 is a part-cross-sectional end elevational view of the machine illustrated in FIGURE 7 looking in the direction of arrow "X,"

FIGURE 9 is a cross-sectional view taken along the line Y—Y shown in FIGURE 7,

FIGURE 10 is a part-cross-sectional side elevational view of part of the machine illustrated in FIGURE 7 and FIGURE 11 is a part-cross-sectional end elevational view taken along the line Z—Z shown in FIGURE 10.

Figure 1:
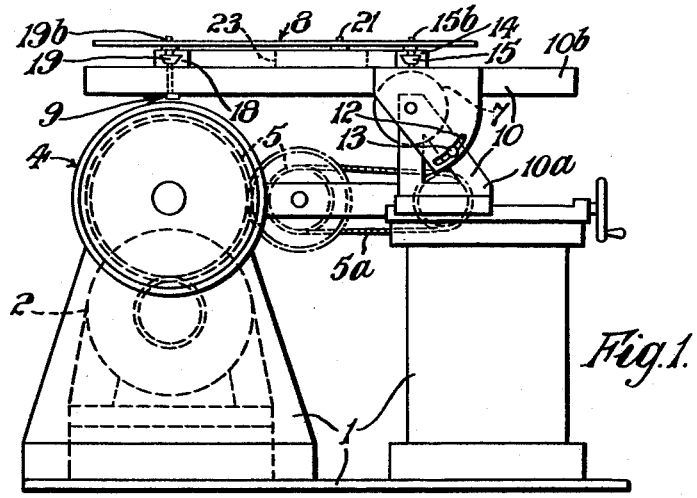

The apparatus illustrated in FIGURES 1, 2, and 3 will now be described.

Briefly, the apparatus comprises a machine framework 1 upon which is mounted a driving motor 2 which is directly connected by means of a shaft 3 to a collapsible cylindrical winding former 4 and through a gear train 5 and chain 5a to a telescopic and universally jointed shaft 6 which transmits the drive to a cam 7 for operating a mechanism 8 for reciprocating a thread guide 9 axially of a cylindrical winding on surface 4a of the former 4.

The cam 7 is rotatably mounted on a cam frame 10 the base portion 10a of which is slidable on the machine framework by means of the lead screw 11 and handwheel 12a operating in conjunction with a lead-screw nut (not illustrated) attached to the base portion 10a. Rotation of the handwheel causes the base portion 10a to move towards and away from the former 4. The upper portion 10b of the cam frame is pivotally mounted about the rotational axis of the cam 7, an arcuate slot 12 and fixing bolt 13 being provided on the upper portion 10b of the cam frame so that it may be fixed in a desired angular position in order that the thread guide 9 is located adjacent to the winding surface of any one of a range of formers of different outside diameters. A channel 14 is rigidly attached to the portion 10b of the cam frame, the channel being provided with a dove-tailed cross-section groove (see FIGURE 1) within which there is slidably mounted a cam follower 15 having a portion of correspondingly dove-tailed cross-section which slidably engages with the groove. A pivotal portion 15b of the cam follower engages with the elongated slot 16 formed adjacent to one end of a lever 17, the pivotal portion 15b having a screw-threaded connecting enabling it to be secured in a desired position in the slot 16 or, alternatively, when the screw-threaded connection is released, to be slidable in the slot 16.

A channel 18, similar to the channel 14, is rigidly yet adjustably attached to the upper portion 10b of the cam frame, by means of bolts located in slots, formed in the upper portion 10b of the cam frame, within which the bolts are slidable to adjust the position of the channel 18 on the portion 10b. A slidable member 19, of dove-tailed cross-section, is located in a groove in the channel 18 and has a pivotal portion 19b which is slidable in a slot 20 formed in the lever 17 at the other end thereof to the end with which the cam is associated. The pivotal connection 19b may be secured to the slot 20 by means of a screw-threaded connection or, alternatively, may be slidable in the slot 20 after the manner of the pivotal connection 15b.

The lever 17 is pivotally connected intermediate its ends on the upper portion 10b of the cam frame. The connection is made by means of the pivot pin 21, the pin being located in a slot 22 within which it may be secured in a desired position, for the purpose of adjusting the width of the reinforcement to be wound, as will later be described. The pivot pin is located in a slot 23 formed in the upper portion 10b of the cam frame, the slot being formed on an axis disposed at right angles to the axis of rotation of the cam and of the former, and the pin being slidable in the slot or, alternatively, secured in a desired position within the slot, by means of a screw-threaded connection. The adjustment of the pivotal connections of the lever 17 in order to obtain winding paths of different form and width will be described later in the specification.

The thread guide 9 is shown in detail in FIGURE 3 and comprises a supporting plate 24 which is attached by means of the bolts 25 to the slidable member 19. A bracket 26 is adjustably attached to the supporting plate 24 by means of the bolts 27 which are slidable in the slots 28. A tubular castering shaft 29 is slidable in, and rotatably mounted on, the bracket 26 and is provided with a collar 30 and a spring 31 which abuts a limb 26a of the bracket 26 and a face of the collar 30 so as to urge the castering shaft radially inwardly with respect to the former 4. A grooved guide pulley 32 is freely rotatably mounted on a spindle 33 which is off-set with respect to the longitudinal axis of the castering shaft 29 and has its axis of rotation disposed at right angles to the said axis of the castering shaft. It will be appreciated that rotation of the former 4 in the direction illustrated by the arrow "Y" will cause the guide pulley 32, when it runs in contact with the winding surface 4a, to caster in the manner shown in FIGURE 3 and assume the required winding angle, this angle being determined by the relative rates of rotation of the former and of reciprocation of the thread guide pulley across the former surface as will be more readily appreciated as the description proceeds.

The machine may be adjusted so that various types of winding paths may be obtained.

Figure 2:
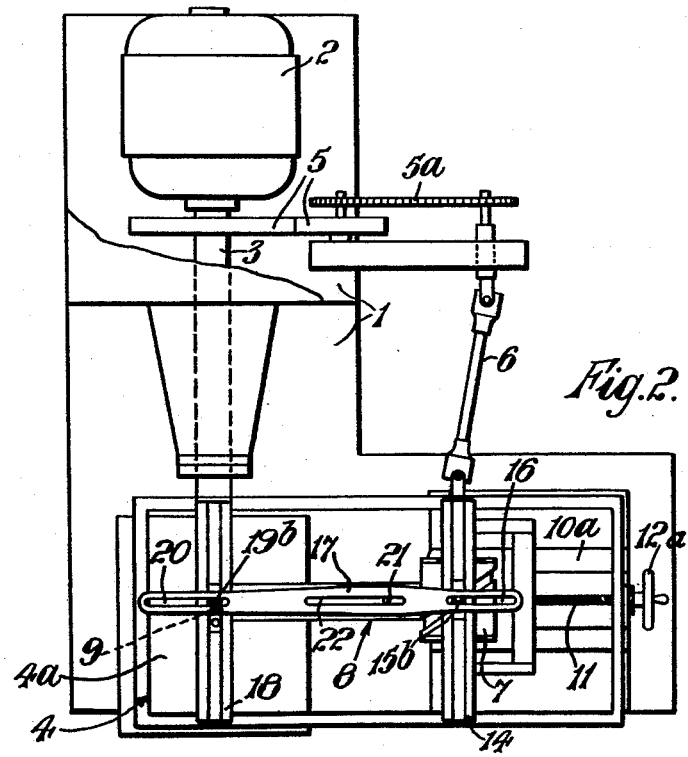

Three main types of winding paths are obtainable utilising the cam 7 illustrated in FIGURES 1 and 2 which is provided with a continuous cam groove disposed at a constant helix angle, the cam groove being of well-known form and being adapted to reciprocate the cam follower 15 from one side of the cam to the other and back again at a constant linear velocity when the cam is rotated at a constant angular velocity.

When it is desired to wind a length of cord on the former winding surface along a straight line from one side of the winding surface to the other (see FIGURE 4 which illustrates a winding path extending from one side of the surface to the circumferential median plane thereof), the pivotal portions 15b and 19b and the pivot pin 21 are adjusted as follows.

The pivot pin 21 is indicated in FIGURE 4 by the letter "Y" and is secured in the slot 23 formed in the cam frame and is also secured in the slot 22 formed in the lever 17, the lever 17 then being capable only of pivotal movement relative to the cam frame. The pivotal portions 15b and 19b have their screw-threaded connections adjusted so that they are capable of sliding movement in their respective slots 16 and 20. When the cam is rotated the follower 15 is reciprocated in the channel 14 at a constant linear velocity, as already stated, and FIGURE 4 shows the pivotal portion 15b in various positions indicated by the reference characters Z, 1, 2, 3, 4, 5 and 6. The corresponding positions of the pivotal portions 19b are illustrated by the reference characters X, 1, 2, 3, 4, 5 and 6. It will be seen from the upper part of FIGURE 4 that when the former is displaced by amounts corresponding with those of the cam follower, the resulting winding path is a straight line.

FIGURE 5 illustrates one half of a winding path of a sinusoidal nature. In this instance the pivotal point 19b is secured in position in the slot 20, the pivot pin 21 is secured to the lever in the slot 22, the pivot pin 21 being adjusted so as to be slidable in the slot 23 formed in the cam frame, and the pivotal portion 15b is adjusted so as to be slidable in the slot 16. In FIGURE 5 the pivotal point 19b is indicated in various positions shown by the reference characters X, 1, 2, 3, 4, 5 and 6, and the pivot pin 21 is indicated in various corresponding positions Y0, Y1, Y2, Y3, Y4, Y5, and Y6 and the pivotal portion 15b is illustrated in corresponding positions Z, 1, 2, 3, 4, 5 and 6. It will be seen that when the former is displaced by amounts corresponding to the displacement of the cam follower the resulting winding path is of a sinusoidal nature as shown in FIGURE 5.

In order to obtain winding paths of a cycloidal nature as illustrated in FIGURE 6, the pivotal portions 15b and 19b and the pivot pin 21 are adjusted as follows:

The pivotal portion 15b is secured in the slot 16, the pivot pin 21 is secured to the lever in the slot 22 and is slidable in the slot 23 formed in the cam frame, and the pivotal portion 19b is adjusted so as to be slidable in the slot 20. Similar reference characters are used in FIGURE 6 to those that are used for FIGURE 5 and it will be seen with reference to FIGURE 6 that a winding path is obtained which is of a cycloidal nature.

It will be appreciated that, by means of the lever and pivotal assembly just described, windings of the type illustrated in the FIGURES 4, 5 and 6 can be obtained in various widths by adjusting the lengths of (for example see FIGURE 4) "XY" and/or "YZ."

The operation of the apparatus illustrated in FIGURES 1 to 6 to wind a breaker reinforcement, will now be described with the pivotal portions 15b and 19b and the pivot pin 21 adjusted as described in connection with FIGURE 6

A length of cord covered with an unvulcanised rubber compound and leading from a supply of cord located adjacent to and above the former 4, is passed through the tubular shaft 29 and underneath the grooved guide pulley 32, between the pulley and the winding surface 4a, the cord being secured in position on the surface 4a by means of a thin sheet of unvulcanised rubber compound previously wrapped around the said winding surface.

When the motor 2 is rotated, the former 4 is directly driven and the cam 7 is driven through the gear train 5, the chain 5a and the shaft 6, the overall ratio of the drive being such as to rotate the former 4 and the thread guide 9 at the correct speed or speeds in order to form the required reinforcement winding, the former rotating, in this instance, for one revolution plus a small part of a revolution for three complete rotations of the cam, and thus three complete reciprocations of the thread guide, so that after a subsequent revolution of the drum plus a small amount of a revolution, the cord is laid on the winding surface in parallel relationship to and alongside the winding of cord laid during the preceding rotation.

Rotation of the cam 7 reciprocates the lever 17 which transfers its motion to the slidable member 19 and thread guide 9 so that the latter is reciprocated from one side to the other across the rotating winding surface 4a for a plurality of times to produce a winding of cycloidal nature, a portion of which is illustrated in FIGURE 3.

The machine just described is capable of winding reinforcements either for use as breakers or for use as carcass reinforcements. A suitable example for use as a carcass reinforcement is wound on a path of sinusoidal nature, the angle of the cord adjacent to the edges of the reinforcement being approximately 30° to an intersecting line running circumferentially around the former and the angle where it crosses the circumferential median plane being approximately 70°. During winding of this carcass reinforcement two complete reciprocations of the thread guide are required for each substantially complete revolution of the former upon which it is wound.

A further example suitable for use as a carcass reinforcement is wound with the cord lying on a path of cycloidal nature, the angle of the cord adjacent to the edges of the reinforcement being approximately 72° to an intersecting line running circumferentially around the former, and the angle of the cord, where it crosses the circumferential median plane, being approximately 54°. During winding of this carcass reinforcement two complete reciprocations of the thread guide are required for each substantially complete revolution of the former upon which it is wound.

If it is desired to obtain windings in which the winding path is of a stepped nature, as described in the above mentioned co-pending application, the cam discribed in the above embodiment, which provides a constant linear velocity drive to the follower, may be replaced by a suitable cam to drive the follower at different linear velocities along different portions of its stroke.

A suitable example of a winding of stepped nature for use as a breaker is formed utilising a cam of the type last-mentioned and is wound so that the lengths of cord adjacent to each edge of the breaker and for ⅕ of the width of the breaker at each edge, lie at an angle of about 40° to an intersecting line running circumferentially around the former, the remainder of each length of cord being disposed at an angle of approximately 20° relative to the circumferential median plane of the breaker. During winding of the breaker, three complete reciprocations of the thread guide are required for each substantially complete revolution of the former upon which it is wound.

The apparatus illustrated in FIGURES 7, 8, 9, 10 and 11 will now be described.

A shaft 34 is rotatably mounted on the machine frame 35, the shaft extending from one side of the machine frame and carrying a former 36 (not shown in FIGURES 7 and 8 but shown in FIGURES 10 and 11). A winding surface 36a of the former 36 comprises an intermediate crowned portion and a cylindrical portion at each end thereof. The shaft 34 also extends from the machine frame at its other end 37 and is drivably connected, at this end, to an electric driving motor and reduction gear box (not illustrated). The end 37 of the shaft is connected by means of chains and sprockets 38, the chains being tensioned by pulleys 39 and 40, to the cam shaft 41. The cam shaft is provided with a cam 42 having a groove 43, the groove being so designed as to provide, by means of the mechanism later to be described, a winding path of a curved nature upon the winding surface 36a of the former 36, the path having an angle of inclination, relative to a circumferential line intersecting the cord adjacent to both edges, of approximately 45° and an angle of inclination of approximately 30° where the path crosses the circumferential median plane.

A cam follower 44 is located in the groove 43 and is provided with a dove-tailed portion 45 slidable in the dove-tailed slot 46 provided in the guide bar 47. The other end 48 of the follower engages with a slot 49 provided adjacent to one end of a reciprocable lever 50.

The lever 50 is provided with a pivot pin 51 attached thereto by means of a screw-threaded connection 52, the other end of the pivot pin being clamped in a slot 53 formed in a supporting bar 54 attached to the machine frame. The pivot pin 51 can be secured in any desired position within the slot 53, and the lever is freely pivotable about the pivot pin on the bush 55.

The other end of the lever 50 is provided with a pivot pin 56 which is freely rotatable in the slot 57 formed adjacent to the end of the lever. The pivot pin 56 is rigidly attached to the slide bar 58 which is constrained to reciprocate along a path parallel to the axis of rotation of the former 36 by means of guiding channel members 59.

A thread guide supporting bracket 60 is rigidly attached to the slide bar 58 by means of the bolts 61 which pass through the elongated slots 62 formed in the bracket 60.

A tubular guide shaft 63 is rotatably mounted on a bearing 64 (see FIGURES 10 and 11) which engages with the outer peripheral surface of the lever hub 65. A key 66 is rigidly located in a longitudinal keyway 67 formed in the lever hub, an extended keyway 68, formed in the shaft 63, being slidable on the key 66, the shaft 63 thus being vertically reciprocable with respect to the lever hub 65 yet not rotatable relative thereto, the shaft 63 and the lever hub 65 being, on the other hand, rotatable in the bearing 64. The rotation and reciprocation of the shaft will be more fully appreciated as the description proceeds.

The lever hub 65 carries a gear wheel 69 (see FIGURE 9) which is rigidly attached thereto and which engages with a freely rotatable pinion 70, the pinion 70 itself engaging with a further freely rotatable gear wheel 71. A pinion 72, directly connected to the gear wheel 71, engages with a rack 73 formed mid-way between the ends of a double-ended solenoid plunger 74 which is reciprocable in the bearings 75 attached one to each side of the bracket 60. Reciprocation of the double-ended solenoid plunger 74 reciprocably rotates the shaft 63 through the rack 73 and the gear wheels and pinions 72, 71, 70 and 69. A pair of solenoids 76 and 77 are mounted one on each side of the machine frame in a manner such that one end of the double-ended solenoid plunger 74 is locatable within the bore 76a or 77a of the solenoids 76 and 77. A pair of micro-switches 78 and 79 are attached one to each of the solenoids, and actuating pins 80 and 81, one for each micro-switch, are rigidly yet adjustably attached to the bracket 60.

The lever hub 65 is provided with a radially extending arm 82 and carries at its free end a roller follower 83 which is engageable, in a manner to be later described, with a cam slot 86 or 87 formed in a pair of cam bars 84 and 85 rigidly attached to the machine frame 35.

A guide pulley bracket 88 is slidably and non-rotatably mounted on the lower end of the shaft 63. A pin 89 projecting radially outwardly of the shaft 63 and rigidly attached thereto, is located in a slot 90 (see FIGURE 11) formed longitudinally of the guide pulley bracket 88 which is thus able to move axially relative to the shaft 63. A collar 91 is rigidly attached to the shaft 63 and a spring 92 is interposed between the collar and the bracket 88 so as to urge the bracket axially and downwardly of the shaft 63 so that a freely rotatable grooved guide pulley 93, attached to the end of the bracket on the spindle 94, is urged towards the winding surface 36a.

The upper end of the shaft 63 is freely rotatably mounted in a housing 95 by means of the ball race 96. The housing 95 is rigidly attached to a shaft extension 97, the shaft extension being pivotally mounted by means of a pin 98 on a lever 99. The lever 99 is provided at the end carrying the pin 98 with a follower 100 which rotatably engages with a cam surface 101 provided on a plate cam 102 rigidly attached to the machine frame 35.

The other end of the lever 99 is pivotally mounted by means of the pivot 103 upon a bracket 104, rigidly attached to the slide bar 58, and a spring 105 is mounted on the pivot 103 and serves to urge the lever 99 upwardly so that the follower 100 is held in contact with the cam surface 101. The cam surface 101 is designed so that upon reciprocation of the guide pulley across the former winding surface, the follower 100 will move the shaft 63 and thus the pulley 93 so that the latter will be rotatably held closely adjacent to the former as the pulley is traversed up or down either of the steeply inclined sides of the former, and in contact with the former as the pulley is traversed across the crowned portion and the cylindrical portions of the winding surface 36a.

During this traversing movement, the grooves 86 and 87 actuate the follower to rotate the shaft 63 and thus adjust the angle of inclination of the guide pulley 93 so that a winding path of a curved nature is obtained. At the end of the traversing movement, in either direction, one or other of the solenoids is actuated so that the lever 82 is rotated and the follower transferred from one groove to the other.

The operation of the apparatus outlined above to wind a carcass reinforcement will now be described.

Rotation of the motor and reduction gear box rotates the cam 42 and the former 36 at correct relative speed or speeds so as to produce a reinforcement having a curved winding path and having two complete reciprocations of the cord from one side of the former to the other and back again for each substantially complete revolution of the former in the manner as described in connection with the preceding embodiment.

The cam 42 reciprocates the lever 50 so that the slide bar 58 is reciprocated in the channel members 59. The slide bar carries the bracket 60 from one side of the winding surface 36a to the other and back again and the guide pulley 93 lays a cord on the winding surface along the required path. As the guide pulley moves across the winding surface, the angular disposition of the pulley 93 (see FIGURES 10 and 11) is adjusted by means of the double-ended solenoid plunger 74 and associated solenoids 76 and 77 together with the associated actuating micro-switches 78 and 79. As the bracket 60 is traversed, for example, towards the solenoid 76, the plunger 74 is traversed into the bore 76a of the solenoid. The micro- switch actuating pin 80, when the plunger 74 projects into the solenoid bore 76a by a predetermined amount, contacts the micro-switch 78 to close a circuit to energise the solenoid 76 whereby the plunger 74 is drawn within the solenoid bore 76a so as to rotate the lever hub 65 and the shaft 63 through the rack 73 and associated gears and pinions, in order to adjust the angle of inclination of the pulley for the return traverse across the former winding surface. Rotation of the hub 65 also rotates the lever 82 and causes the follower 83 to be transferred from engagement with the groove 86 to engage the groove 87. When the bracket 60 is traversed so that the other end of the plunger 74 projects into the solenoid bore 77a, the micro-switch 79 and the solenoid 77 operate in the manner just described so as to rotate the shaft 63 to adjust the angle of inclination of the guide pulley suitably for the return traverse thereof, and so as to transfer the follower 83 from the cam groove 87 to the cam groove 86.

The cam grooves 86 and 87 each operate so as to rotate the shaft 63, through the follower 83, arm 82, hub 65 and key 66, in order to adjust the angle of inclination of the pulley 93 while it is being traversed from one side of the winding surface 36a to the other, in order to obtain the correct winding path.

It will be appreciated that the apparatus just described is suitable not only for winding carcass reinforcements but also for winding breakers.

It will be noted that in connection with the machine illustrated in FIGURES 1 to 6 the angle of inclination of the guide pulley is automatically effected by castering action. Such an arrangement is particularly useful when the spacing of adjacent lengths of cord is relatively open at the edges of the reinforcement. On the other hand the machine illustrated in FIGURES 7 to 11 incorporates solenoids and plungers for adjusting the angle of inclination of the guide pulley at each end of each of the winding paths. Such an arrangement is particularly useful when the spacing of adjacent lengths of cord is relatively close at the edges of the reinforcement.

Other arrangements of solenoids to that described in connection with FIGURES 7 to 11 are possible, for example, changes in the angle of inclination of the guide pulley at each end of its traversing movement may be effected by solenoids, in the manner described, changes in the angle of inclination of the guide pulley during the said traversing movement, in order to obtain a winding path of stepped form, may be obtained by the utilisation of a solenoid and plunger mounted on the bracket provided for the guide pulley and operatively connected to the shaft to which the said pulley is attached by means of a suitable linkage.

It will be noted that in the machines illustrated and described, the cam provided for reciprocating the guide pulley, is operatively connected to an associated lever adjacent to one of its ends. In an alternative construction a cam is operatively connected to an associated lever intermediate its ends, the lever being pivotally connected at one end to a machine frame and being operatively connected at its other end to a guide pulley.

Whereas in the machines illustrated, the guide pulley is reciprocated by means of a cam and lever mechanism, in an alternative construction, the guide pulley is reciprocated by means of a motor driven lead-screw and an associated screw-threaded nut attached to the bracket carrying the guide pulley. The speed of rotation of the lead-screw is controlled to obtain the required winding path, and at each end of the traverse of the guide pulley, the motor driven lead-screw is reversed.

In a further alternative construction the reciprocation of the guide pulley is obtained by means of an hydraulic piston and cylinder, the bracket carrying the guide pulley being operatively connected to the piston. Hydraulic fluid is supplied to one side of the piston at a predetermined rate or rates so as to cause traversing movement of the guide pulley at a predetermined rate or rates in one direction to obtain the required winding path, the hydraulic fluid being supplied to the other side of the piston to obtain the reverse traverse. The supply of hydraulic fluid to one side or the other of the piston is controlled by electrically or mechanically operated valves operated by the machine driving mechanism.

In the machines described the speed of rotation of the former relative to the speed of operation of the guide pulley traversing mechanism decides the number of complete traverses of the cord for each substantially complete circumference of cord around the former. It will be appreciated that the number of complete traverses for each substantially complete circumference of the cord around the former may be adjusted by adjusting the ratio of the gearing transmitting the drive from the motor to the guide pulley traversing mechanism, or by otherwise adjusting the drive to the mechanism according to its type. In the machines described the former rotates one revolution plus a small amount for a given number of complete traverses of the guide pulley. In an alternative arrangement the former rotates just short of a complete revolution for a given number of complete traverses of the guide so that after the next substantially complete rotation of the former, the cord will lie on the winding surface in parallel relationship and alongside the cord laid during the preceding former revolution.

Having now described my invention, what I claim is:

1. Apparatus for winding pneumatic tyre reinforcing bands comprising a former having an outer peripheral winding surface, means for continuously rotating the former, a guide pulley for the material to be wound comprising means for guiding cord between the former and the periphery of said guide pulley, means for urging the guide pulley into contact with the winding surface, and reciprocable means connected to the guide pulley for moving it transversely from side to side repeatedly during each revolution of the drum over the winding surface at a rate relative to the rate of rotation of the former in order to form the said reinforcement band.

2. Apparatus according to claim 1 comprising a castering shaft having its longitudinal axis disposed radially relative to the former, said guide pulley being mounted on said shaft so as to be capable of castering action thereon during winding of the said material.

3. Apparatus according to claim 1 wherein reciprocable means connected to the guide pulley are provided for positively adjusting the angle of inclination of the guide pulley relative to a circumferential line on the former at the point under consideration.

4. Apparatus according to claim 3 wherein the means for positively adjusting the angle of inclination of the guide pulley comprises a double ended reciprocable plunger, a transmission operatively connecting said plunger to the guide pulley to adjust the inclination of said pulley relative to a circumferential line of the winding surface of said former, a pair of associated solenoids located one adjacent to each end of the stroke of the guide pulley whereby reciprocating movement of the double-ended plunger carries the ends of the plunger into operative association with the said solenoids, and switching means electrically connected to the solenoids and automatically operable by said pulley reciprocating means, means for moving said guide pulley transversely over the winding surface when the pulley reaches substantially one end or the other of a stroke to energize a solenoid and operate the plunger to adjust the angle of inclination of the guide pulley for the succeeding stroke.

5. Apparatus according to claim 4 comprising a shaft carrying said pulley, the shaft being normal to the axis of rotation of the pulley and rotatable on its axis, said transmission comprising a rack formed on the plunger between its ends and a gear train engaged by said rack and connected to said shaft to rotate said shaft.

6. Apparatus according to claim 5 comprising a lever rigidly fixed to the pulley shaft, a cam follower mounted on said lever, cam means having a pair of cam surfaces each disposed axially with respect to the former, one of said cam surfaces actuating the follower during traversing of the guide pulley in one direction so as to adjust the angle of inclination of the guide pulley appropriately to the reinforcement to be wound and the other cam surface operating similarly to adjust the said angle during traverse of the pulley in the other direction.

7. Apparatus according to claim 1 wherein the means for moving the guide pulley transversely over the winding surface comprises a rotatable cam having an outer peripheral surface with a continuous cam groove disposed at a substantially constant helix angle, and a cam follower traversable from one side of the cam to the other and back again when the cam is rotated at substantially constant angular velocity.

8. Apparatus according to claim 1 wherein the means for moving the guide pulley transversely over the winding surface comprises a rotatable cam having an outer peripheral surface with a continuous cam groove having a helix angle which varies along the length of the groove and a cam follower traversable from one side of the cam to the other and back again at a variable linear velocity when the cam is rotated at substantially constant angular velocity.

9. Apparatus according to claim 7 comprising a cam frame for supporting the cam with its axis of rotation parallel to that of the former and having a channel disposed with its longitudinal axis parallel to the axis of rotation of the cam and engaged by the cam follower so that the follower is reciprocable by the cam along the channel, a bracket carrying the guide pulley, said bracket being reciprocable along a path parallel to the axis of rotation of the former, and a lever pivotally associated at one end with the cam follower, pivotally associated at its other end with the bracket and pivotally connected intermediate its ends to the cam frame, said pivotal connections being such as to allow reciprocation by the cam of the guide pulley to obtain the desired reinforcement winding.

10. Apparatus according to claim 9 wherein the bracket is attached to a member slidable in a channel disposed with its longitudinal axis parallel to the axis of rotation of the former.

11. The apparatus of claim 10 in which said lever has a longitudinal slot, a supporting frame having a slot normal to the axis of rotation of said cam and of said former and a pivot pin slidably mounted in the slot of said bracket and slidably engaging the slot in said lever, and means to fix said pin individually in each of said slots.

12. Apparatus according to claim 11 comprising a machine framework on which the cam frame is adjustably mounted so that the rotatable cam is movable towards and away from the former and wherein the lever is provided with a longitudinal slot within which the intermediate pivot pin is adjustably clamped.

13. Apparatus according to claim 10 wherein a portion of the cam frame which carries the lever, the cam follower channel and the thread guide bracket channel is pivotable about the axis of rotation of the cam and is locatable in a plurality of angular positions whereby the thread guide may be operatively located adjacent to each of the winding surfaces of formers of various outside diameters.

14. Apparatus according to claim 1 wherein the former is provided with a cylindrical winding surface.

15. Apparatus according to claim 1 wherein the former is annular and is provided with a winding surface of profiled cross-section and wherein means are provided for controlling the movement of the guide over the profiled winding surface which means comprises a guide freely slidable radially towards and away from the former, a cam having a cam surface disposed axially with respect to the former, a cam follower operatively connected to the guide and contacting the cam surface, and resilient means for urging the follower into contact with the cam surface.

References Cited in the file of this patent

UNITED STATES PATENTS

| | | |
|---|---|---|
| 1,318,151 | Howard | Oct. 7, 1919 |
| 1,728,957 | Dickinson | Sept. 24, 1929 |
| 2,184,326 | Thomas | Dec. 26, 1939 |
| 2,531,571 | Hyde | Nov. 28, 1950 |
| 2,555,343 | Jones | June 5, 1951 |
| 2,565,071 | Frazier | Aug. 21, 1951 |
| 2,609,320 | Modigliani | Sept. 2, 1952 |
| 2,679,885 | Sapp et al. | June 1, 1954 |
| 2,710,275 | Waggoner | June 7, 1955 |
| 2,723,215 | Biefeld et al. | Nov. 8, 1955 |
| 2,728,972 | Drummond et al. | Jan. 3, 1956 |